United States Patent Office 3,436,244
Patented Apr. 1, 1969

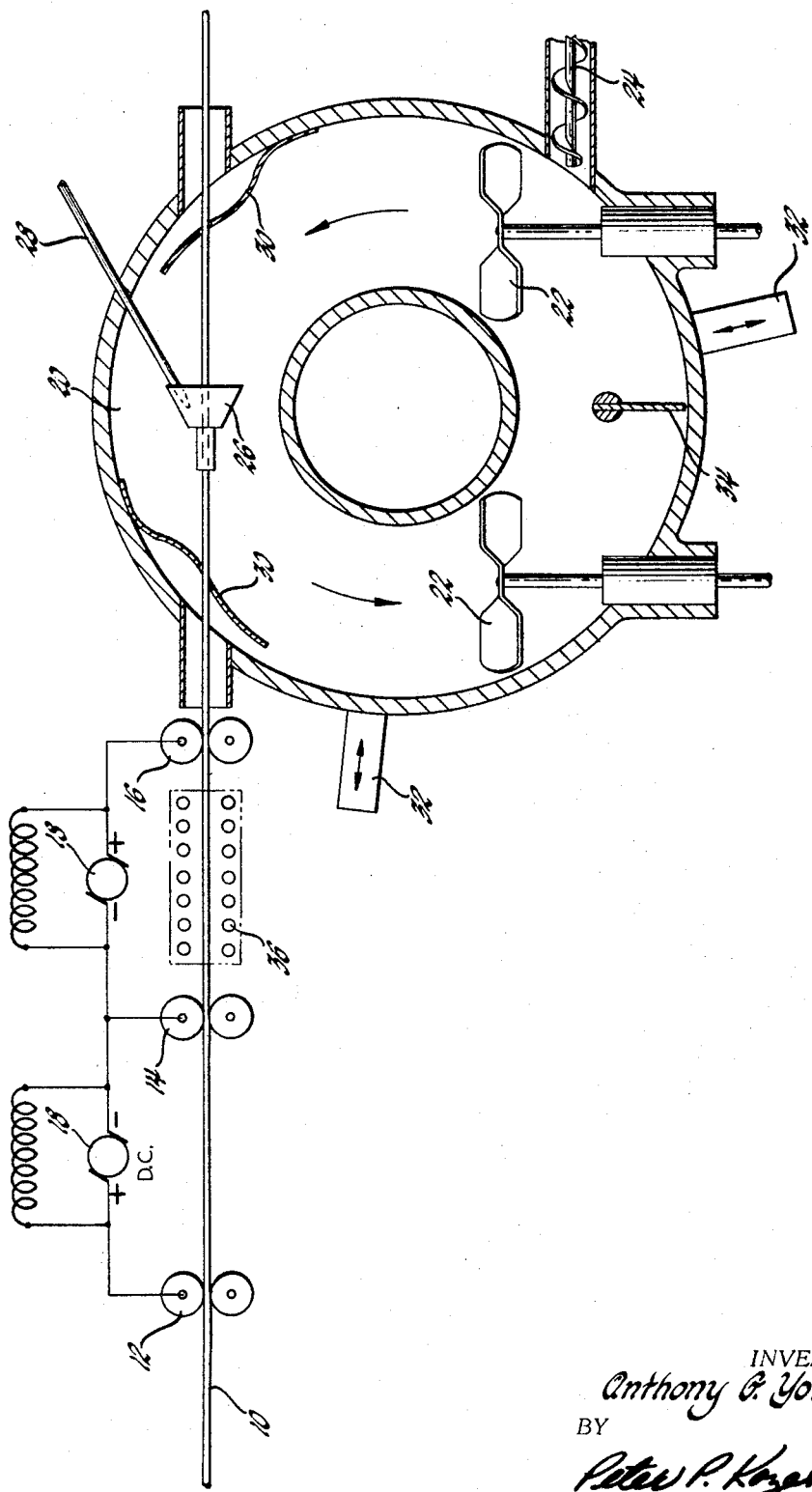

3,436,244
FUSION COATING OF METAL ARTICLES
Anthony G. Yokawonis, Rochester, N.Y., assignor to General Motors Corporation, Detroit, Mich., a corporation of Delaware
Filed June 29, 1965, Ser. No. 467,933
Int. Cl. B44c 1/08
U.S. Cl. 117—18           9 Claims

ABSTRACT OF THE DISCLOSURE

In a preferred embodiment an elongated metallic article is coated by passing it through a vertically disposed doughnut-shaped vessel wherein thermoplastic coating powder is suspended and whirled around the vessel in the circumferential direction. An elongated article such as tubing, pipe or wire is heated to a temperature above the melting point of the coating material and then passed through the vessel in a manner such that some of the powder contacts the surface, is melted by the heat and fuses to the article thereby coating it. The rest of the powder continues to recycle within the vessel.

---

This invention relates to coating elongated metallic articles and more particularly to a method of continuously applying a coating material to such metallic articles where the coating material is initially in powdered form.

An example of the present invention is the application of a copper coating to steel tubing. In a standard technique of the prior art this has been accomplished by heating the steel tubing to about 500° F. using electrode rollers which are connected to low voltage, high current DC generators. A mixture of copper powder, flux, and oil is sprayed onto the tubing and the tubing and coating subsequently heated to approximately 2200° F., the oil boiling off and the copper powder melting and fusing to the surface of the steel tubing. This method was troublesome because the introduction of electrically conducting or any gritty material onto the tubing soon wore out the electrode rollers. In addition, the liquid portion of the mixture boiled off giving caustic and obnoxious vapors which had to be properly handled before emitting them to the atmosphere.

It is an object of this invention to provide a method of continuously coating the external surface of metallic elongated articles with a coating material initially in powdered form whereby the above disadvantages are avoided. The coating is desired to make the metallic tubing corrosion resistant, decorative, or electrically insulated.

It is another object of this invention to provide an apparatus by which a powdered coating material may be applied by fusion in a thin uniform coating to the external surface of a metallic article of indefinite length.

It is a further object of this invention to provide a method and apparatus by which a coating may be continuously fused to the external surface of metallic tubing without producing caustic and obnoxious vapors.

It is a more specific object of this invention to provide a method and apparatus for the application of a a copper coating to steel tubing where the tubing is of indefinite length and the copper coating material is in powdered form.

It is also an object of this invention to provide a method and apparatus by which the surface of an indefinite number of metal articles may be coated with a coating material initially in powdered form.

These and other objects are accomplished by heating the elongated metallic article or individual metal articles to a temperature above the melting point of the coating material to be applied, and moving said heated metallic article through a suspension of the coating material, said coating material being metallic or non-metallic and initially in powdered form, said suspension being maintained by whirling the powders about an annular space in the path of said moving article whereby powder continuously comes against said article and is melted by the high heat and fuses with the rest of the powder adhering to the surface coating it completely.

FIGURE 1 is a schematic representation of the subject apparatus.

The invention will now be described in terms of a specific embodiment in which a metal coating is applied to metal tubing.

Conventionally, metallic tubing is formed on a tube forming mill and subsequently subjected to annealing, cooling, coiling, flaring and other operations. When the tubing is to be coated it is normally coated immediately as it leaves the mill and prior to any further processing steps. In this invention as the steel tube 10 leaves the tube mill (not shown) it is received between three sets of electrode rollers 12, 14 and 16. The rollers are connected across low voltage, high current DC generators 18 whereby the tube is resistance heated to a temperature of about 500° F. between rollers 12 and 14 and to about 2200° F. between rollers 14 and 16. The ultimate temperature to which the tubing must be heated must be higher than the melting point of the coating material. Also the temperature must be high enough to allow for possible heat loss between the stage at which the tubing is heated and point at which the powdered coating material comes against the hot surface. In the case of copper coating, it has been found desirable to heat the steel tubing to about 2200° F.

Other forms of heating, of course, could be used, induction heating could be substituted for the resistance heating. In FIGURE 1 an induction heater 36 is indicated within the area set off by the broken lines. This would be an alternative source of heat and the DC generators 18 and lead wires would be eliminated. In some applications induction heating might be superior to resistance heating. With resistance heating the walls of the tubing are heated uniformly through the whole cross section. This is unnecessary and wasteful of electric current. Furthermore, when steel tubing is subsequently annealed, the grain structure and ductility of the tubing is not quite as good when annealed from 2200° F. as would be the case when annealed from about 1400° F.

In the subject invention it is only necessary to heat the surface, and for this purpose standard methods of induction heating can be used. Thus, in the case of a copper coating, the surface only can very quickly and easily be heated to high temperature for deposition of powders and the surface will correspondingly cool quickly.

The hot tubing 10 passes into the doughnut or torus shaped vessel 20 in which copper powders are circulated and come into intimate contact with the tubing. A torus is a surface of rotation formed by revolving a circle or other plane closed curve about an axis lying in its plane but not intersecting it. The vessel 20 includes a toroidal space therein in which are positioned propellers or screw devices 22. Copper powders are introduced by screw delivery means 24 into the vessel, and are caused to whirl about the annular space by means of these propellers 22. The pitch of the propeller blades or the direction of rotation is such that the powders flow in a circular path as indicated in FIGURE 1. The tube 10 passes through the converging funnel 26 and as the copper powders whirl around the vessel they are concentrated by the converging funnel 26 in the immediate vicinity of the hot steel tube 10 as the powder circulates around this heating surface. Some of the powder contacts the surface, is melted by the high heat and fuses with the rest of tht powder adhering to the surface and coating it completely. A stream of hydrogen containing reducing gas flows into the funnel through a tube 28 to clean the hot tubing 10 and to prevent oxide formation on the tube during the coating process. After the steel tube 10 leaves the doughnut shaped vessel 20 it is cooled and annealed.

The baffles 30 are provided to prevent the copper powders from leaving the vessel at the entrance and exit points respectively. An agitator 34 is provided to prevent the powder from settling at the base of the vessel. The vessel is cooled, as for example by water jacket, by means not shown and it is vibrated by the vibrators 32 to prevent the copper powders from fusing to the vessel walls.

To prevent the formation of oxide on the tubing during the heating process between the rollers, the steel tubing in this area may be surrounded by suitable larger tube (not shown) into which a reducing gas is introduced. Similarly, as the tube leaves the coating vessel it may be passed through a larger tube (not shown) into which a reducing gas is introduced and the steel tubing is thus protected until after it has been cooled. The reducing atmosphere preferably comprises about 15% hydrogen, 10% carbon monoxide, 75% nitrogen and usually small traces of other gases. Before start-up with the coating operation the subject vessel 20 should be purged with the reducing gas mixture. This will eliminate that main source of oxygen which would corrode the hot metal surface.

This invention contemplates an apparatus in which the powdered coating material may be circulated and recirculated over the surface of the hot metal tubing. Therefore, the preferred embodiment involves a doughnut or torus shaped vessel. However, it is apparent that the objects of the invention can be accomplished by an apparatus which is modified slightly from the torus shape. For example, the sides can be flattened or otherwise distorted from the cylindrical cross section. Any apparatus configuration in which the powdered coating material may be swept over the hot metal surface and the unused material recycled will satisfy the objects.

Similarly, as shown in the specific embodiment, the preferred path of the elongated metal article lies in the plane of the whirling suspended powders and through the annular space that they occupy in a direction approximately tangential to their orbit. This path is preferred because the coating may be more efficiently and uniformly applied. However, it is apparent that any exposure of the hot metal to the suspended powders will result in some coating.

The vessel 20 is water cooled. This is normally accomplished by providing the vessel with a jacket. The purpose of the cooling is to prevent the vessel from heating up to a point at which the coating material will fuse upon its surface.

The preferred embodiment describes the important industrial operation of coating steel tubing with copper. Obviously the subject process and apparatus may readily be used to coat any elongated metallic article with an appropriate coating material. In addition, it is apparent that the subject process and apparatus could also be used for coating an indefinite number of individual metal articles by hanging them upon suitable conveyor means and heating them by induction and passing them through a suitable suspended coating material.

The selection of the coating material will not depend upon the subject process or apparatus but rather will depend upon the adaptability of the coating material to the metal, the relative melting points of the coating material and the metal tubing and the desired function of the coating.

Examples of materials which are useful in the application of this invention, depending, of course, upon the composition of the elongated metal article, are: dry powdered metals such as copper, zinc, manganese, tin and nickel; dry prepowdered alloys such as aluminum-nickel, copper-chromium, copper-iron, and tin-zinc; dry powdered refractory materials such as magnesium oxide; and dry powdered thermoplastic synthetic resins such as polyethylenes, polystyrenes, acrylic resins, and the linear polyamides, generally referred to as nylons.

Thus, while the embodiment of the present invention as herein disclosed constitutes a preferred form, it is to be understood that other forms might readily be adopted.

I claim:
1. A method of coating elongated metal articles which comprises suspending and whirling thermoplastic powdered coating material within a substantially vertically disposed, enclosed toroidal-shaped space, the bulk flow of said suspended coating material being unidirectional in a circumferential circular orbit around and within said toroidal space; heating said metal article to a temperature above the melting point of said coating material; moving said heated elongated article through said toroidal space in the path of said whirling coating material whereby a portion of said powder continuously comes against said heated article, is melted by the heat thereof and fuses to the surface of said article substantially coating it and the rest of said powder continues to circulate in said circumferential path within said enclosed toroidal space.

2. A method of coating metal articles which comprises suspending and whirling thermoplastic powdered coating material within a substantially vertically disposed, enclosed toroidal-shaped space, the bulk flow of said suspended coating material being unidirectional in a circumferential circular orbit around and within said toroidal space; heating said metal articles to a temperature above the melting point of said coating material; moving said heated articles through said toroidal space in the path of said whirling coating material whereby a portion of said powder continuously comes against said heated articles, is melted by the heat thereof and fuses to the surface of said articles substantially coating them and the rest of said powder continues to circulate in said circumferential path within said enclosed toroidal space.

3. A method of coating elongated metal articles which comprises suspending and whirling thermoplastic powdered coating materials within a substantially vertically disposed, enclosed toroidal-shaped space, the bulk flow of said suspended coating materials being unidirectional in a circumferential circular orbit around and within said toroidal space; heating said metal article to a temperature above the melting point of said coating material; moving said heated elongated article through said toroidal space in the path of said whirling coating material; concentrating a portion of said powdered coating material against said heated article whereby powder continuously comes against said article, is melted by the heat thereof and fuses to the surface of said article substantially coating it and the rest of said powder continues to circulate in said circumferential path within said enclosed toroidal space.

4. A method of coating elongated metal articles which comprises suspending and whirling thermoplastic powdered coating material within a substantially vertically disposed, enclosed toroidal-shaped space having a gaseous atmosphere inert to oxidation, the bulk flow of said suspended coating material being unidirectional in a circumferential circular orbit around and within said toroidal space; heating said metal article to a temperature above the melting point of said coating material; moving said heated elongated article through said toroidal space in the path of said whirling material; and concentrating a portion of said powdered coating material against said heated article whereby powder continuously comes against said article, is melted by the heat thereof and fuses to the surface of said article substantially coating it and the rest of said powder continues to circulate in said circumferential path within said enclosed toroidal space.

5. A method of coating steel tubing with a thin layer of copper which comprises suspending and whirling powdered copper within a substantially vertically disposed, enclosed toroidal-shaped space having a reducing gaseous atmosphere, the bulk flow of said suspended copper powder being unidirectional in a circumferential circular orbit around and within said toroidal space; heating said steel tubing to a suitable temperature above the melting point of said suspended copper powder; moving said tubing through said toroidal space in the path of said whirling copper powder; concentrating a portion of said copper powder against said heated steel tubing whereby copper powder continuously comes against said tubing, is melted and fuses to the surface of said tubing substantially coating it and the rest of said powder continues to circulate in said circumferential path within said enclosed toroidal space.

6. An apparatus for the coating of the surface of metal articles comprising a vessel adapted to enclose a substantially toroidal-shaped space disposed in a substantially vertical position, wherein thermoplastic powdered coating material may be suspended and whirled in a substantially circular path from the lower portion of the toroidal space through the upper portion of said toroidal space and back through the lower half of said toroidal space; mechanized blower means within said toroidal space adapted for suspending and whirling said powdered coating material; means adapted to move a said metal article through said coating material; means external to said toroidal space and upstream therefrom with respect to the direction of movement of said article for heating said article to at least the melting temperature of said coating material; and means for feeding said coating material into said vessel at a rate sufficient to replace the coating material that adheres and fuses to said metal surfaces.

7. An apparatus for the coating of the external surface of elongated metal articles comprising a vessel adapted to enclose a substantially toroidal space disposed in a substantially vertical position, wherein thermoplastic powdered coating material may be suspended and whirled in a substantially circular path from the lower portion of said toroidal space through the upper portion of said toroidal space and back through the lower half of said toroidal space; mechanized blower means within said toroidal space adapted for suspending and whirling said powdered coating material; means adapted to move said elongated article through said suspended coating material; means external to said toroidal space and upstream therefrom with respect to the direction of movement of said elongated article for heating said metal article to at least the melting temperature of said coating material; funnel means within said toroidal space and in the path of said elongated article for directing said suspended powdered coating material against the hot surface of said elongated article; and means for feeding said coating material into said toroidal space at a rate sufficient to replace the coating material that adheres and fuses to said metal surface.

8. An apparatus for the coating of the external surface of elongated metal articles comprising a vessel adapted to enclose a substantially annular toroidal space disposed in a substantially vertical position wherein thermoplastic powdered coating material may be suspended and whirled in a substantially circular path from the lower portion of said toroidal space through the upper portion of said toroidal space and back to the lower half of said toroidal space; mechanized blower means within said toroidal space adapted for suspending and whirling said powdered coating material; roller means adapted to move said elongated article through said suspended coating material in a substantially horizontal path lying in the plane of said toroidal space; means external to said toroidal space and upstream therefrom with respect to the direction of movement of said article for heating said metal article to at least the melting temperature of said coating material; funnel means within said toroidal space and in the path of said elongated article for directing said suspended powdered coating material against the hot surface of said elongated article; and means for feeding said coating material into said vessel at a rate sufficient to replace the coating material that adheres and fuses to said metal surface.

9. An apparatus for the copper coating of the external surface of steel tubing comprising a vessel adapted to enclose a reducing gaseous atmosphere in a substantially toroidal space disposed in a substantially vertical position, wherein powdered copper may be suspended and whirled in a substantially circular path from the lower portion of said toroidal space through the upper portion of said toroidal space and back to the lower half of said toroidal space; mechanized blower means within the lower portion of said toroidal space adapted for suspending and whirling said powdered copper; roller means adapted to move said steel tubing through said suspended powdered copper in a substantially horizontal path lying in the plane of said toroidal space; means external to said toroidal space and upstream therefrom with respect to the direction of movement of said tubing for heating said steel tubing to at least the melting temperature of said copper; funnel means within the upper portion of said toroidal space and in the path of said steel tubing for concentrating and directing said suspended powdered copper against the hot surface of said steel tubing; tube means for admitting a reducing gas into said toroidal space at a path within said funnel means to clean and protect said steel tubing from oxidation; and means for feeding powdered copper into said vessel at a rate sufficient to replace the copper that adheres and fuses to said hot steel tubing.

References Cited

UNITED STATES PATENTS

| | | | |
|---|---|---|---|
| 1,068,680 | 7/1913 | Lotz | 118—309 |
| 2,815,550 | 12/1957 | Valyi | 22—10 |
| 2,907,299 | 10/1959 | Weiner | 118—309 |
| 3,108,022 | 10/1963 | Church | 117—21 X |
| 3,183,113 | 5/1965 | Gemmer | 117—22 X |
| 3,207,618 | 9/1965 | DeHart | 117—21 X |
| 3,208,808 | 9/1965 | Strobel et al. | 117—21 X |
| 3,233,584 | 2/1966 | Angstadt | 117—21 X |
| 3,361,111 | 1/1968 | Strobel et al. | 118—309 |

WILLIAM D. MARTIN, *Primary Examiner.*

PAUL F. ATTAGUILE, *Assistant Examiner.*

U.S. Cl. X.R.

117—21, 22; 118—309, 312, 405